Figure 1:
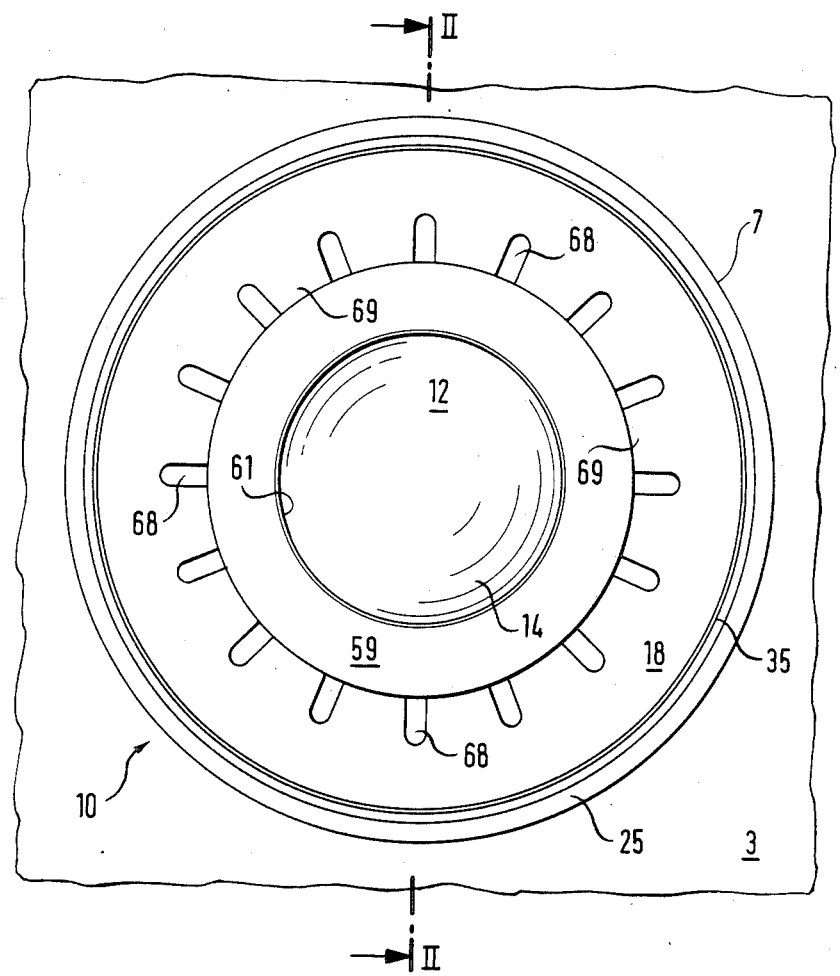

United States Patent [19]
Huber

[11] Patent Number: 4,689,847
[45] Date of Patent: Sep. 1, 1987

[54] BALL UNIT

[75] Inventor: Thomas Huber, Iffeldorf, Fed. Rep. of Germany

[73] Assignee: Electro-Pneumatic-International GmbH, Hausham, Fed. Rep. of Germany

[21] Appl. No.: 836,943

[22] Filed: Mar. 6, 1986

[30] Foreign Application Priority Data

Mar. 6, 1985 [DE] Fed. Rep. of Germany ....... 3507945

[51] Int. Cl.$^4$ ............................................. B60B 33/08
[52] U.S. Cl. ........................................... 16/26; 16/24
[58] Field of Search ...................... 16/18 R, 21, 24–28, 16/44, DIG. 35; 193/35 MD

[56] References Cited

U.S. PATENT DOCUMENTS

| 568,241 | 9/1896 | Fackuer | 16/24 |
| 3,466,697 | 5/1968 | Cain et al. | |
| 3,478,382 | 11/1969 | Nosenzo | 16/24 X |
| 3,557,401 | 1/1971 | Jenkins | |
| 3,739,894 | 6/1973 | Hinman | 16/26 X |

FOREIGN PATENT DOCUMENTS

| 2213021 | 9/1972 | Fed. Rep. of Germany | |
| 348453 | 9/1972 | U.S.S.R. | 193/35 MD |

Primary Examiner—Nicholas P. Godici
Assistant Examiner—Carmine Cuda
Attorney, Agent, or Firm—Sughrue, Mion, Zinn, Macpeak, and Seas

[57] ABSTRACT

A ball unit (10), in particular for conveying devices (1), possesses a load ball (12), which by a part (14) of its surface can bear against a load object, a bearing unit (24), which so bears and encloses the load ball to be freely rotatable that a free part (14) of the load ball surface projects out of the bearing unit through a circular passage opening (61), and a holder (20), which for fastening of the ball unit at a carrier frame of the conveying device displays a fastening portion (31), which can be borne on the carrier frame. The bearing unit (24) is so linearly movable to and fro relative to the holder (20) that the free load ball surface in an advanced end position protrudes further beyond a surface (3) of the carrying frame than in a withdrawn end position. Stressed between bearing unit and holder is a spring (18), which is constructed as flatly bowed annular washer, supported against the holder in immediate proximity of its fastening portion, is arranged concentrically with the passage opening of the bearing unit and biasses the bearing unit into the advanced end position.

14 Claims, 2 Drawing Figures

BALL UNIT

The invention concerns a ball unit, or ball-transfer unit in particular for conveying devices such as for example ball mats, or pallets or floors, with a load ball which by a part of its surface can bear against a first body, in particular against a load object to be displaced by way of the conveying device, a bearing unit which bears the load ball to be freely rotatable and to a large extent so encloses it that a free part of the surface of the load ball projects out of the bearing unit through a circular passage opening to bear against the first body, a holder which, for the fastening of the ball unit at a second body, in particular at the carrying frame of a conveying device, displays a fastening portion which in the assembled state bears against the second body, wherein the bearing units is so movable to and fro linearly relative to the holder between an advanced and a withdrawn end portion that the free surface of the load ball in the advanced end position projects further beyond a surface of the second body than in the withdrawn end position, and with a spring, which is stressed between bearing unit and holder, is arranged concentrically with the passage opening of the bearing unit as seen in direction of the linear movement of the bearing unit and which biasses the bearing unit into the advanced end position.

Ball transfer units of that kind are for example known from the U.S. Pat. No. 3,466,697, in which also the preferred case of application of such a ball unit, namely as component of a conveying device, is illustrated in FIG. 9 of this patent.

A ball unit according to the invention is however not restricted to this case of application, but can be employed wherever two bodies standing in contact each with the other shall be displaceable each relative to the other with least possible resistance along a surface. A further example is the use of ball units according to the invention as furniture castors which are so mounted at the underside of a piece of furniture that the piece of furniture is supported through them at the floor.

Conveying devices, in which ball units according to the invention come into use, are for example so-called ball mats as they find use in the gate region of aircraft load spaces. They display a carrier frame with a planar surface, over which the load objects are moved, which shall be loaded into or out of the loading space of an aircraft. A plurality of ball units is so fastened to the carrier frame of such a ball mat that the free surfaces of the load balls project about equally far beyond the planar surface of the carrier frame and by their crest points form the actual "conveying surface", on which the load objects are supported.

Such a conveying device makes it possible to displace the load objects parallelly to the conveying surface in desired directions, thus for example during the loading of the aircraft initially to push them transversely to the longitudinal axis of the aircraft through the gate of the loading space into the interior of the aircraft and then to move them further in the loading space transversely to this direction of pushing-in.

The load ball of each ball unit is borne and retained in a bearing unit, which on the one hand assures a free rotatability of the load ball, but at the same time also retains it locally fixed in directions parallel to the conveying surface and prevents that the load ball detaches from the ball unit.

When a load object displays a not quite planar underside or is somewhat inclined relative to the conveying surface, it can occur that its front edge in the conveying direction does not run freely over the crest point of a load ball, but impinges on the free surface of the load ball below the crest substantially parallelly to the conveying surface. In order that it does not in this case come to a damaging of the load ball and/or the load object and in order that the displacement of the load object is not too strongly braked hereby, the bearing unit and with it the load ball of each ball unit is not mounted directly, but by way of a holder at the carrier frame of the conveying device and linearly displaceable perpendicularly to the conveying surface relative to this holder. This linear movement of bearing unit and load ball is limited to two abutments so that an advanced end position and a withdrawn end position result, wherein the load ball in the advanced end position protrudes further beyond the surface of the carrier frame of the conveying device than in the withdrawn end position. Provided between the bearing unit and the holder, which serves for the fastening of the ball unit at the carrier frame, is a spring which biasses the bearing unit into the advanced end position.

Thus, in the case of the above described lateral impinging of a load object onto the free surface of a load ball, the load ball together with its bearing unit can give way perpendicularly to the conveying surface, while the spring between bearing unit and holder is stressed. By reason of the deviating movement of the load ball, the load object can slide free of problems over the load ball which is then pressed by the spring against its underside and thus in conjunction with the other load balls continues to support the load object.

In the case of the ball units according to the U.S. Pat. No. 3,466,697, the holder is constructed as pot-shaped housing which in the region of its front end face, through which the free part of the surface of the load ball projects, is fastenable at the carrier frame of the conveying device. Provided in the interior of this pot-shaped housing is a helical spring which at the one end bears against the rearward pot bottom and at the other end bears from the rear against the bearing unit in order to bias this towards the front side of the ball unit.

It is here pointed out that designated as "front side" in the present application is always that side of the ball unit, beyond which the free surface of the load ball protrudes. In the conveying device illustrated in the U.S. Pat. No. 3,466,697, this front side just as in the later explained example of embodiment according to the invention lies at the top with respect to the gravitational field of the earth. Since a ball unit according to the invention can however be used equally well for a relative support or guidance, which is directed laterally or downwardly in the gravitational field, of a first body relative to a second body, at which it is mounted, the more general expressions "front" and "rear" are used here instead of "above" and "below".

A ball unit, built up according to the U.S. Pat. No. 3,466,697, is however disadvantageous in so far as it consists of a great number of parts and is not optimal in respect to its weight as well as also its overall size.

Thereagainst, the invention is based on the task of so developing a ball unit of the initially named kind that for the strength and loadability remaining the same, it displays fewer parts, a lower weight and a smaller overall size than is the case in the units according to the state of the art.

For the solution of this problem, the invention provides in combination with the features of the classifying clause of the claim 1 that the spring is constructed as a flatly bowed annular washer and supported at the holder in immediate proximity of its fastening portion.

By reason of these measures, in a ball unit according to the invention, all those parts can be omitted, which are necessary in the state of the art in order to transmit the reaction force exerted by the spring on the bottom of the pot-shaped housing onto the fastening portion or region of the holder, by which this is fastened at the body carrying the ball unit, thus for example at the carrying frame of a conveying device, and is supported for a force transmission. Since the reaction force of the spring in the withdrawn end position, for example for ball mats, amounts to about 550 newtons, the parts required for the transmission of this force in the state of the art must display a correspondingly great wall thickness so that they contribute to a substantial extent to the overall weight of the ball unit. Through the use of a spring, preferably a plate spring, pressing onto its counterbearing in substantially radial direction, and through the support of this spring in immediate proximity of the fastening region of the holder, a force introduction of the spring reaction force into the body carrying the ball unit takes place over the shortest path in the case of a ball unit according to the invention without special force transmission parts with a specially adapted wall thickness being required for this. Thus, a weight reduction of more than 25% compared with the hitherto usual ball units lets itself be attained already for the ball unit itself.

A particular advantage of the ball unit according to the invention is to be seen in that it displays a very low overall height in axial direction because of the extraordinarily small axial extent of the spring in the shape of an annular washer. In fact, in the case of a ball unit according to the invention, the axial overall height is restricted to the minimum amount given by the diameter of the load ball, the axial extent of the bearing unit and the stroke of the linear movement required for springing. It is thereby possible for example also to reduce the corresponding height of the carrier frame of a ball mat, which leads to a further saving in weight for the carrier frame of this ball mat.

According to a preferred embodiment, the holder of the ball unit is constructed to be as small as possible thereby, that it displays substantially the shape of a circularly annular cylinder which in the movement direction of the bearing unit possesses a height which is less than the radius of the load ball, that the central opening of the circularly annular holder is arranged concentrically with the passage opening of the bearing unit as seen in direction of movement of the bearing unit, that the bearing unit and the load ball are disposed for the greatest part on the rear side of the holder and that the load ball so projects through the central opening of the holder that the free part of the surface of the load ball is disposed at the front side of the holder.

In order to assure as good as possible a guidance of the bearing unit during its linear movement to and fro, it is provided according to the invention that the bearing unit, which possesses substantially the shape of a thin-walled partial hollow ball enclosing the load ball for the greatest part, comprises a substantially circularly cylindrical wall portion, the external surface of which displays envelope lines extending parallelly to the linear movement direction and which extends through the central opening of the holder, wherein its external diameter is only slightly smaller than the internal diameter of the central opening. This portion, which is about circularly cylindrical on its outside, of the bearing unit in conjunction with the circular central opening of the holder ensures an adequate guidance of the bearing unit during its linear movement to and fro without any parts, serving for guidance and in that case disadvantageously increasing the overall height, of the bearing unit and/or of the holder having to be provided for this behind the rear crest of the bearing unit part in the shape of a hollow ball.

Preferably, the spring is arranged in the front side of the holder, beyond which the free part of the surface of the load ball protrudes. It is in that case advantageous that the holder on its front side, i.e. in immediate proximity of the region, by which it is fastened to the body carrying the ball unit, displays a circularly annular projection, the internal wall surface of which displays envelope lines extending parallelly to the linear movement of the bearing unit, and that the spring bears by its external rim against the internal wall surface of the circularly annular projection and engages by its internal rim into an outwardly open groove which is provided in that part of the wall portion of the bearing unit, which projects beyond the front side of the holder.

A particularly simple limitation of the linear movement of the bearing unit and of the load ball retained in it results on the one hand thereby, that the withdrawn end position of the bearing unit is defined by an abutment surface, against which the rear surface of the spring in the shape of an annular washer comes to bear in this end position, on the front side of the holder, and on the other hand thereby, that the advanced end position is defined by an abutment surface, against which a shoulder of the bearing unit bears in the advanced end position, on the rear side of the holder.

In order to assure a play-free seating of the bearing unit and a gentle running-in of the bearing unit into the advanced end position and in order to facilitate the assembly of a ball unit according to the invention, it is furthermore provided that an elastic body, which in the advanced end position is compressed by the force of the spring in the shape of an annular washer, is provided between the abutment surface on the rear side of the holder and the shoulder of the bearing unit.

It is furthermore provided for as simple as possible an assembly of the ball unit according to the invention that the bearing unit is constructed in two parts and that the one part displays substantially the shape of a thin-walled partial hollow ball which encloses somewhat more than half of the load ball and the other part displays substantially the shape of a ball socket ring which continues the course of the wall of the partial hollow ball. Preferably, both these parts are so constructed that the ball socket ring is plugged into the partial hollow ball and connected with this thereby, that the front rim of the partial hollow ball is beaded over a shoulder of the ball socket ring.

A particularly simple and rigid, weight-saving build-up results thereby, that the internal diameter of the partial hollow ball is substantially greater than the external diameter of the load ball, that a plurality of bearing balls is provided in the intermediate space in the shape of a partial spherical shell hereby formed between the load ball and the partial hollow ball and that the ball socket ring at its end plugged into the partial hollow ball displays a radially extending annular wall portion closing off the intermediate space.

A particularly weight-saving and yet still rigid build-up lets itself be attained thereby, that webs, which project in radial direction and the internal outline of which displays a radius which is only little greater than the external radius of the load ball, are provided at the internal surface of the ball socket ring.

In order to be able to set the stress of the plate spring independently of the diameter to the respectively required value, slots are provided in the spring, which extend radially outwards from the internal rim. The projections projecting inwardly between the slots contribute practically nothing to the stress of the plate spring which is determined substantially only by the solid annular region, into which the slots do not extend. With the aid of these projections not contributing to the stress, the diameter of the plate spring can thus for about constant stress be so chosen freely within a large range that the respectively desired stroke for the linear movement of the bearing unit and of the load ball results. Conversely, in the case of predetermined stroke, the stress of plate spring can be varied within a wide range through the choice of the length of the radially extending slots.

Figure 2:
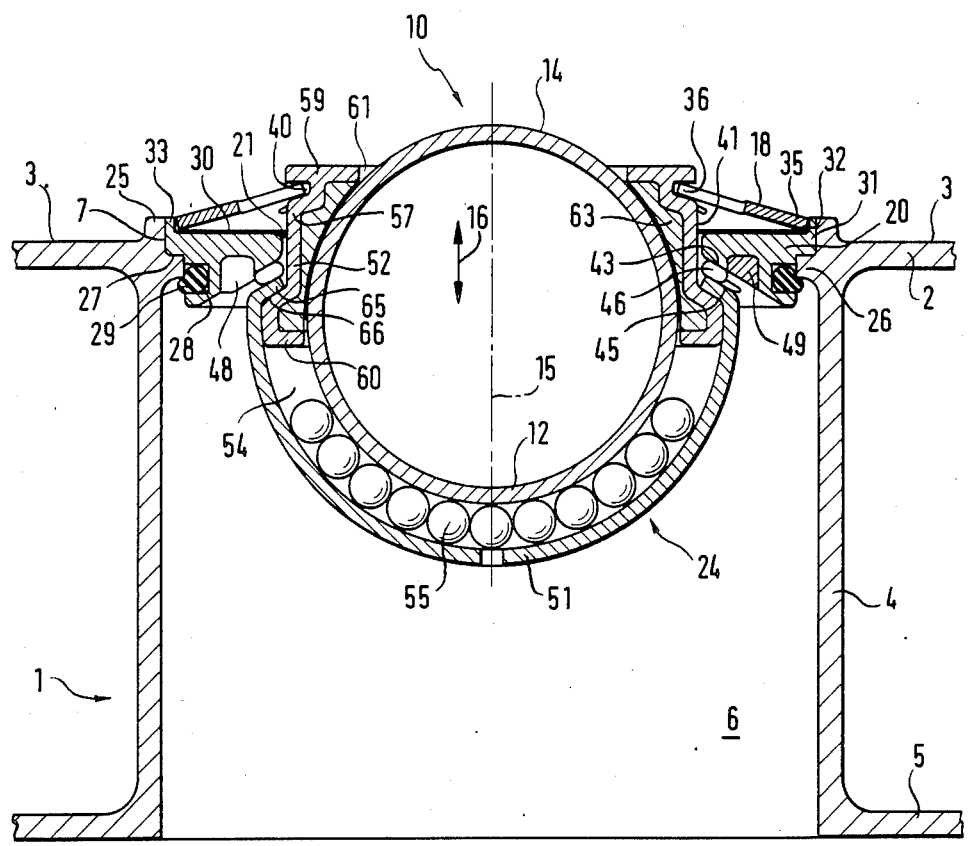

The invention is described in the following with the aid of an example of embodiment with reference to the drawing; in this, there show:

FIG. 1 a plan view onto the part of the surface of a ball mat which comprises a ball unit according to the invention and FIG. 2 a section through the ball mat part of FIG. 1 along the line II—II.

Reproduced in the FIGS. 1 and 2 is a detail of a so-called ball mat 1, as it for example finds use in the gate region of aircraft load spaces.

Such a ball mat consists essentially of a planar hollow body, of large area and low height, which is made of metal, for example aluminium, and which is so arranged on the floor in the gate region of an aircraft load space that the outer surface 3 of its upper, horizontally extending wall 2 forms the bottom surface of the load space entry region. The load objects, for example the pallets, with which the aircraft is to be loaded, are initially pushed over this surface transversely to the longitudinal axis of the aircraft through the gate of the load space into the interior of the aircraft and then conveyed further transversely to this pushing-in direction in the load space.

For weight-saving, the upper wall 2 of the ball mat hollow body is supported only by mutally spaced webs 4 against the bottom wall 5, which rests on an appropriate carrying surface at the bottom of the aircraft load space.

The ball mat 1 displays a plurality of hollow spaces 6 between the upper wall 2, the bottom wall 5 and the webs 4.

The upper wall 2 possesses a plurality of passage openings 7, which are arranged at regular spacings and of which only a single one is illustrated in the FIGS. 1 and 2.

A ball unit 10 according to the invention is so inserted from above through each of these openings 7 into the hollow space 6 concerned that the load ball 12 by a part 14 of its surface protrudes forwardly, i.e. upwardly in the present case, beyond the surface 3 of the ball mat.

It is attained through this arrangement that the objects, with which the aircraft shall be loaded or discharged, stand in contact not with the surface 3 of the ball mat 1, but only with the surface parts 14 of the load balls 12.

These load balls 12 are so borne that they are locally fixed, but freely rotatable in directions parallel to the surface 3 of the ball mat 1. Thus, the ball mat 1 forms a conveying device, over the surface 3 of which objects can be freely displaced in desired directions, for which substantially only the rolling resistance of the load balls 12 need be overcome.

The ball unit 10 displays an axis of symmetry, which is perpendicular to the surface 3 and which in FIG. 2 is illustrated by a dashed line.

The possibility exists that a not completely planar or somewhat obliquely hanging pallet during displacement impinges by its front edge in direction of movement on the part 14 of the surface of a load ball 12 below the uppermost crest point. In order in such a case to avoid a damage of the load ball or of the pallet and to keep the resistance against the displacement of the pallet as small as possible, the load balls 12 are displaceable to and fro in direction of the symmetry axis 15 between two end positions, as this is indicated by the double arrow 16 in FIG. 2.

Illustrated in FIG. 2 is the front end position, into which the load ball 12 is biassed by the force effect of a spring 18 and in which it protrudes further outwardly beyond the surface 3 of the ball mat 1 than in the other end position.

Thus, the load ball 12 on a lateral impingement of a pallet edge or the like can spring away by about 2.5 millimeters rearwardly, i.e. in the direction of the hollow space 6, whereby a damaging or an obstruction of the displacement movement of the pallet is avoided. When the edge, forward in the direction of movement, of the load object has run away over the ball crest, then the load ball 12 concerned is pressed by the force of the spring 18, which for example lies in the order of magnitude of 55 kilograms, from below against the bottom of the pallet or the load object moving away over the conveying device and supports this load object together with the other load balls.

For the attainment of these functions, a ball unit according to the invention possesses a special build-up which is described in detail in the following.

For the fastening in the opening 7 of the ball mat 1, the ball unit 10 according to the invention comprises a holder 12, which in the example of embodiment reproduced in the figures is constructed substantially as circularly cylindrical ring which is arranged co-axially with the symmetry axis 15 and in axial direction displays a height which is substantially smaller than the diameter of the load ball 12.

In the centre, the holder 20 possesses a circularly shaped central passage opening 21, through which the load ball and a part of the bearing unit 24 surrounding the load ball protrude, wherein the load ball 12 as well as also the bearing unit 24 are likewise arranged or constructed to be circularly symmetrical to the symmetry axis 15.

The external diameter of the holder 20 is so dimensioned that the holder can be inserted in a region of the surface 3 surrounded by a circularly annular projection 25, wherein the projection 25 slightly protrudes upwardly beyond the surface 3 of the upper wall 2 of the ball mat 1. The diameter of the opening 7 in the upper wall 2, into which the ball unit 10 is inserted, is somewhat smaller than the internal diameter of the projection 225 so that the upper wall 2 displays a shoulder 26, which surrounds the opening 7 in circularly annular shape, protrudes towards the axis of symmetry 15 and on the outer surface of which the holder 20 rests by a radially outwardly projecting shoulder 27 provided in its cylindrical outer wall. Provided underneath this shoulder 27 at a small axial spacing in the cylindrical external surface of the holder 20 is an annular groove 28, which encircles the entire holder 20 and into which is inserted an annular, elastically deformable body 29, which can for example be formed by an O-ring. The cross-sectional diameter of this elastic body 29 is so dimensioned that the elastic body 29 slightly projects out of the groove 28 radially to one side. When the ball unit 10 in FIG. 2 is introduced from above through the opening 7 into the hollow space 6 of the ball mat, the elastic body 29 is in that case so compressed that it is completely received into the groove 28 and slides past at the annularly projecting shoulder 26. When the ball unit 10 has reached the installed position illustrated in FIG. 2, then a part of the elastic body 29 is so pressed out of the groove 28 laterally by reason of the restoring force effected through its elastic deformation that it engages below the shoulder 27. Thereby, the ball unit 10 is secured to an adequate degree against falling out of the ball mat 1. When the ball unit 10 is however intentionally to be taken out of the ball mat 1 in order for example to be exchanged against a new ball unit, then a comparatively small force, which is exerted upwardly on the ball unit 10 for example in the region of the groove 40, suffices to shear the protruding part of the elastic body 29 off at the shoulder 26 and to move the ball unit 10 upwardly out of the hollow space 6.

On its front or upper end face, the holder 20 displays a planar abutment surface 30, which in the installed state extends parallelly to the surface 3 of the upper wall 2 of the ball mat 1 and over which protrudes forwardly, or upwardly in FIG. 2, a projection 33 arranged at the outermost circumferential rim of the holder 20. The external rim 35 of the spring 18, here constructed as plate spring, is supported at the annular inner wall surface 32, facing the axis of symmetry, of this projection 33. The outer wall surface of the projection 25 of the ball mat 1; this support of the plate spring 18 in the fastening portion 31, i.e. in that region of the holder 20, in which this in its turn is supported against the ball mat 1, yields an optimal introduction into the ball mat 1 of the reaction forces exerted by the plate spring 18.

As is evident from the FIG. 2, the plate spring 18, constructed as flatly a bowed washer or annular disk, is so arranged within the annular projection 33 that its convexity points outwardly i.e. the disk's plane is curved or bowed to conform generally to a sphere or truncated cone. The plate spring 18 engages by its internal rim 36 into a groove 40, which is so arranged in a wall surface 41, remote from the symmetry axis 15, of the bearing unit 24 that it runs around the entire bearing unit 24 parallelly to the abutment surface 30.

The spacing, which the groove 40 possesses from the abutment surface 30 in the advanced end position illustrated in FIG. 2, defines the length of the travel, through which the load ball 12 together with the bearing unit 24 holding it can spring inwardly against the force of the plate spring 18. In the completely sprung-in state, the rear side, disposed below in FIG. 2, of the plate spring comes to bear at the abutment surface 30, whereby the inwardly directed movement of the load ball 12 is limited.

The rear end face of the annular holder 20 is bevelled to slope upwardly towards the symmetry axis 15 and in the proximity of its inner edge forms an abutment surface 43, which annularly surrounds the symmetry axis 15 and possesses about the same inclination as the part of the plate spring 18 disposed above it when the load ball 12 with its bearing unit 24 is disposed in the advanced end position. In this forward end position, a shoulder 45 of the bearing unit 24 comes into abutment against an annular elastic body 46, which in its turn bears against the abutment surface 43. The annular elastic body 46, which is arranged concentrically with the symmetry axis 15, can likewise be formed by an O-ring. In the forward end position illustrated in FIG. 2, the annular elastic body 46 is compressed by the outwardly directed force of the plate spring 18 and, through its elastic counterforce built up hereby, biasses the spring 18 somewhat to the rear.

For reasons of saving of weight, a groove 48, which extends upwardly and annularly encircles the entire circumference of the holder 20 and in which webs 49 extending radially towards the axis of symmetry 15 are provided for stiffening, is provided in the rear end face of the holder 20. For example, six or eight webs 49 of that kind can be distributed uniformly over the entire circumference of the holder 20.

The bearing unit 24, in which the load ball 12 is borne and retained to be locally fixed and freely rotatable, consists of an inner part and an outer part. The inner part is a thin-walled partial hollow ball 51, in the interior of which the load ball 12 is borne and which encloses somewhat more than half of the load ball 12. The internal diameter of the hollow ball 51 is substantially greater than the external diameter of the load ball 12, which for reasons of weight is likewise constructed as hollow ball. A plurality of bearing balls 55, which assure a low-friction free rotatability of the load ball 12 in the partial hollow ball 51, is arranged in the intermediate space 54 formed between the external surface of the load ball 12 and the internal surface of the hollow ball 51.

The outer part of the bearing unit 24 is constructed as ball socket ring 52, which displays a thin wall portion 57, which in a direction parallel to the symmetry axis 15 possesses a height which is about equal to the radius of the load ball 12. The wall portion 57 is so bent over at its upper and its lower end that the ball socket ring 52 there respectively displays a front wall portion 59 or rear wall portion 60 each extending about parallelly to the plane of the surface 3.

The ball socket ring 52 of the bearing unit 24 is introduced so far from above into the partial hollow ball 51 that the load ball 12 by the part 14 of its surface can project forwardly, or upwardly in FIG. 2, through a passage opening 61 arranged concentrically with the symmetry axis 15 and surrounded by the front wall portion 59.

The rear wall portion 60 of the ball socket ring 52 extends through the intermediate space 54 from the inside wall of the hollow ball 51 nearly to the surface of the load ball 12. The rear wall portion 60 thus closes off the intermediate space 54 in the shape of a spherical shell so that the bearing balls 55 can not come out of this intermediate space 54.

The ball socket ring 52, too, on its side facing the symmetry axis 15 possesses webs 63, which extend radially towards the symmetry axis 15 and of which for example six or eight pieces are arranged uniformly distributed over the entire circumference of the ball socket ring 52 in order to give it the necessary stiffness.

The partial hollow ball 51 and the ball socket ring 52 are each connected with the other thereby, that the rim 65 of the part 51, which initially is completely in the shape of a part hollow ball, has been beaded around a corresponding shoulder 66 of the ball socket ring 52 after the bearing balls 55 have first been filled into the partial hollow ball 51, the load ball 12 is then arranged on the bearing balls and the ball socket ring 52 has been pushed in from above into the circularly annular slot remaining between the load ball 12 and the inside wall of the partial hollow ball 51.

After this beading operation, the annular holder 20 is pushed from above over the ball socket ring 52 of the bearing unit 24, for which the O-ring 46 can initially be omitted. Thereby, the annular holder 20 can be pushed downwardly until its abutment surface 43 rests directly on the shoulder 45, formed by the beading-over, of the partial hollow ball 51 of the bearing unit 24. In this position, the spacing between the groove 40 and the inner wall surface 32 provided for the support of the plate spring 18 is so great that the plate spring 18 can readily be inserted. When its internal ring 36 has been pushed into the groove 40, the annular holder 20 can then be moved upwardly and the O-ring 46 be brought to its place illustrated in FIG. 2.

As already mentioned, the plate spring 18 and the O-ring 46 in the front end position illustrated in FIG. 2 so bias each the other mutually that the bearing unit 24 and with it the load ball 12 sit without play in the holder 20.

The walls of the partial hollow ball 51 and of the ball socket ring 52 of the assembled bearing unit 24 form an approximately uniform partial spherical shell, in the interior of which the load ball 12 is received and supported by way of the bearing balls 55. The partial spherical shell composed of both the parts is in the region of its upper open rim suspended at the plate spring 18, which in its turn, as already mentioned, is suppoted at the ball mat 1 over the shortest force transmission path by way of the fastening region 31 of the holder 20. Also the forces, which are exerted by "normal" objects, i.e. those resting on the uppermost crest point of the load ball 12, downwardly in FIG. 2 on the load ball 12, are transmitted onto the ball mat 1 over the just described path, i.e. by way of the bearing balls 55, the partial spherical shell 51 and 52 and the plate spring 18 over the counterbearings 32 and 33 thereof. Because of the shortness of this force transmission path and the favorable geometric structuring of the parts of the ball unit 10, which transmit these forces, a very low weight for the ball unit 10 results with high load capacity. The forces exerted on the load ball 12 parallelly to the surface 3 are also received directly by the ball socket ring 52, reinforced by the webs 63, of the bearing unit 24 and transmitted from this either by way of the plate spring 18 or directly onto the holder 20. Because of the small axial height of the holder 20, this direct force transmission takes place practically only in the plane of the upper wall 2 of the ball mat 1, wherein these forces are introduced with very small lever arms directly into the ball mat 1.

As is evident particularly from the FIG. 1, the plate spring 18 displays slots 68, which extend radially outwards from its internal rim and which by their width and radial length on the one hand make possible a setting, largely independent of the diameter of the plate spring 18, of the force exerted by the plate spring 18 and on the other hand facilitate the introduction of the internal rim 36 of the plate spring 18 into the groove 40. In particular, the diameter of the plate spring 18 for a given spring stress and thereby the stroke travel for the load ball 12 and its bearing unit 24 can be set by the slots 68. Since the lugs 69 of the plate spring 18, which extend between the slots 68 radially towards the symmetry axis 15, contribute practically nothing to the stress of the spring, they or the slots 68 can according to requirement be chosen to be longer or shorter in radial direction without the spring stress being altered hereby, when the radial dimension of the not slotted annular part of the plate spring 18 remains unchanged.

Summarising, it is to be noted that by reason of the use of a spring 18 in the form of a flatly bowed washer and because of the hereby possible construction of the holder 20 as a ring very low in axial direction, a ball unit 10 according to the invention in this axial direction possesses a minimum extend which is given substantially only by the diameter of the load ball 12, the diameter of the bearing balls 55, the very low wall thickness of the partial hollow ball 51 and the size of the stroke travel for the deviation movement of the load ball 12. A further reduction in the overall height in direction parallel to the symmetry axis 15 is practically not possible. The ball unit 10 according to the invention beyond this displays an extremely small number of parts which are predominantly constructed to be very thin-walled. This is possible above all for the reasons that the restoring force of the plate spring 18, which is produced on the springing-in of the load ball 12, is introduced into the ball mat 1 over the shortest path. Thus, no parts of the ball unit need for that reason be constructed with a particularly great wall thickness, because they initially have to take up this spring force and then transmit it over greater paths and unfavourable lever arms to the counterbearings formed by the ball mat 1. For equal dimensions and equal rigidity requirements, a ball unit 10 according to the invention thus displays a weight which is reduced by more than 25% compared with the state of the art.

Since however, as is readily evident from the FIG. 2, the height of the webs 4 of the ball mat 1 can also be reduced appreciably because of the small axial overall height of the ball unit 10, an appreciable weight saving likewise lets itself be attained for the carrying frame of the ball mat 1 when it is only still equipped with such a low height as is possible on the use of ball units according to the invention.

I claim:

1. Ball transfer unit, in particular for conveying devices such as for example ball mats, and having a load ball which by a part of its surface can bear against a first body, in particular against a load object to be displaced by way of the conveying device; said ball unit comprising:

a bearing unit which bears the load ball to be freely rotatable and to a large extent so encloses it that a free part of the surface of the load ball projects out of the bearing unit through a circular passage opening to bear against the first body, a holder which, for the fastening of the ball unit at a second body, in particular at the carrying frame of a conveying device, has a fastening portion which in the assembled state bears against the second body, wherein the bearing unit is so movable to and fro linearly relative to the holder between an advanced and a withdrawn end position that the free surface of the load ball in the advanced end position projects further beyond a surface of the second body than in the withdrawn end position, and spring means including a spring which is stressed between the bearing unit and holder, is arranged concentrically with the passage opening of the bearing unit as seen in the direction of the linear movement of the bearing unit and which biases the bearing unit into the advanced end position, said spring (18) being constructed as a flatly bowed annular disk and being supported at the holder (20) in immediate proximity of said fastening portion (31), said disk being bowed to conform generally to a sphere or truncated cone.

2. Ball unit according to claim 1, characterised thereby, that the holder (20) displays substantially the shape of a circularly annular cylinder which in the movement direction (16) of the bearing unit (24) possesses a height which is less than the radius of the load ball (12), that the central opening (21) of the circularly annular holder is arranged concentrically with the passage opening (61) of the bearing unit (24) as seen in direction of movement of the bearing unit (24), that the bearing unit (24) and the load ball (12) are disposed for the greatest part on the rear side of the holder (20) and that the load ball (12) so projects through the central opening (21) of the holder (20) that the free part (14) of the surface of the load ball (12) is disposed on the front side of the holder (20).

3. Ball unit according to claim 1, characterised thereby, that the spring (18) is a plate spring.

4. Ball unit according to claim 3, characterised thereby, that slots (68) are provided in the spring (18) and extend radially outwards from the internal rim (36) of the spring (18).

5. Ball unit according to claim 1 characterised thereby, that the bearing unit (24) is constructed in two parts and that the one part displays substantially the shape of a thin-walled partial hollow ball (51), which encloses somewhat more than half of the load ball (12), and the other part displays substantially the shape of a ball socket ring (52), which continues the course of the wall of the partial hollow ball (51).

6. Ball unit according to claim 5, characterised thereby, that the ball socket ring (52) is plugged into the partial hollow ball (51) and connected with this thereby, that the front rim (65) of the partial hollow ball (51) is beaded over a shoulder (66) of the ball socket ring (52).

7. Ball unit according to claim 6, characterised thereby, that the internal diameter of the partial hollow ball (51) is substantially greater than external diameter of the load ball (12), that a plurality of bearing balls (55) is provided in the intermediate space (54) in the shape of a partial spherical shell hereby formed between the load ball (12) and the partial hollow ball (51) and that the ball socket ring (52) at its end plugged into the partial hollow ball (51) displays a radially extending annular wall portion (60) closing off the intermediate space (54).

8. Ball unit according to claim 5, characterised thereby, that webs (63), which project in radial direction and the internal outline of which displays a radius which is only little greater than the external radius of the load ball (12), are provided at the internal surface of the ball socket ring (52).

9. Ball unit according to claim 1, characterised thereby, that the bearing unit (24), which possesses substantially the shape of a thin-walled partial hollow ball enclosing the load ball (12) for the greatest part, comprises a substantially circularly cylindrical wall portion (57), the external surface of which displays envelope lines extending parallelly to the linear movement direction (16) and which extends through the central opening (21) of the holder (20), wherein its external diameter is only slightly smaller than the internal diameter of the central opening (21) in order to guide the bearing unit (24) during its linear movement.

10. Ball unit according to claim 9, characterised thereby, that the spring (18) is arranged on the front side of the holder (20), beyond which the free part (14) of the surface of the load ball (12) protrudes.

11. Ball unit according to claim 10, characterised thereby, that the holder (20) on its front side displays a circularly annular projection (33), the internal wall surface (32) of which displays envelope lines extending parallelly to the linear movement direction (16) of the bearing unit (24), and that the spring (18) bears by its external rim (15) against the internal wall surface (32) of the circularly annular projection (33) and engages by its internal rim (36) into an outwardly open groove (40), which is provided in that part of the wall portion (57) of the bearing unit (24), which projects beyond the front side of the holder (20).

12. Ball unit according to claim 10, characterised thereby, that the withdrawn end position of the bearing unit (24) is defined by an abutment surface (30), against which the rear surface of the spring (18) in the shape of an annular washer comes to bear in this end position, on the front side of the holder (20).

13. Ball unit according to claim 12, characterised thereby, that the advanced end position of the bearing unit (24) is defined by an abutment surface (43), against which a shoulder (66) of the bearing unit (24) bears in the advanced end position, on the rear side of the holder (20).

14. Ball unit according to claim 13, characterised thereby, that an elastic body (46), which in the advanced end position is compressed by the force of the spring (18) in the shape of an annular washer, is provided between the abutment surface (43) on the rear side of the holder (20) and the shoulder (66) of the bearing unit (24).

* * * * *